(12) United States Patent
Payne

(10) Patent No.: US 7,317,564 B2
(45) Date of Patent: Jan. 8, 2008

(54) REPLAY OPTICS FOR HOLOGRAPHIC DISPLAYS

(75) Inventor: Douglas Payne, Farnborough (GB)

(73) Assignee: F. Poszat HU, LLC, Wilmington, DE (US)

( * ) Notice: Subject to any disclaimer, the term of this patent is extended or adjusted under 35 U.S.C. 154(b) by 0 days.

(21) Appl. No.: 11/494,766

(22) Filed: Jul. 28, 2006

(65) Prior Publication Data

US 2007/0053034 A1 Mar. 8, 2007

Related U.S. Application Data

(63) Continuation of application No. 10/488,185, filed as application No. PCT/GB02/03839 on Aug. 21, 2002, now abandoned.

(30) Foreign Application Priority Data

Aug. 30, 2001 (GB) ................................ 0120981.6

(51) Int. Cl.
G03H 1/08 (2006.01)
(52) U.S. Cl. .......................................... 359/9; 359/32

(58) Field of Classification Search ..................... 359/9
See application file for complete search history.

(56) References Cited

U.S. PATENT DOCUMENTS 5,164,848 A 11/1992 Firth et al.
5,963,667 A * 10/1999 Hashimoto et al. ......... 382/190

FOREIGN PATENT DOCUMENTS

| EP | 0426497 A | 5/1991 |
|---|---|---|
| GB | 2330471 A | 4/1999 |
| WO | WO 9919767 A1 * | 4/1999 |
| WO | 00/75699 A | 12/2000 |

* cited by examiner

*Primary Examiner*—Arnel Lavarias
(74) *Attorney, Agent, or Firm*—Stolowitz Ford Cowger LLP

(57) ABSTRACT

A holographic display comprises a spatial light modulator, SLM, arranged to display a set of tiled holographic images, and illuminating means for illuminating a surface of the SLM. Replay means are provided for focusing light reflected from the SLM surface to present a three dimensional image. The illuminating means comprises a light source appearing substantially at a DC spot position of the replay means.

20 Claims, 4 Drawing Sheets

B ved on the OASLM 2 is "read" using an arrangement

REPLAY OPTICS FOR HOLOGRAPHIC DISPLAYS

This application is a Continuation of application Ser. No. 10/488,185, filed Mar. 1, 2004, now abandoned which is the U.S. national phase of International Application PCT/GB02/03839, filed in English on 21 Aug. 2002, which designated the U.S. PCT/GB02/03839 claims priority to GB Application No. 0120981.6 filed 30 Aug. 2001. The entire contents of these applications are incorporated herein by reference.

BACKGROUND OF THE INVENTION

1. Field of the Invention

The present invention relates to replay optics for holographic displays and in particular to replay optics for generating a three dimensional image from an illuminated spatial light modulator.

2. Discussion of Prior Art

It is well known that a three-dimensional image may be presented by forming an interference pattern or hologram on a planer surface. The three-dimensional image is visible when the hologram is appropriately illuminated. Recently, interest has grown in so-called computer generated holograms (CGHs) which offer the possibility of displaying high quality images, which need not be based upon real objects, with appropriate depth cues and without the need for viewing goggles. Interest is perhaps most intense in the medical and design fields where the need for realistic visualization techniques is great.

Typically, a computer generated hologram involves the generation of a matrix of data values (each data value corresponding to a light transmission level) which simulates the hologram which, might otherwise be formed on a real planer surface. The matrix is applied to a Spatial Light Modulator (SLM) which may be, for example, a two-dimensional array of liquid crystal elements or of acousto-optic modulators. Coherent light is directed onto the SLM using for example a laser such that the resulting output, either reflected from the SLM or transmitted through the SLM, is a modulated light pattern. An example of an SLM is an Electrically Addressable SLM (EASLM).

In order to produce a three-dimensional image of usable size and viewing angle, the SLM typically has to have a large number of pixels, e.g. $10^{10}$. In addition, the pixels of the SLM must be positioned relative to one another with a high degree of accuracy. The device must also be capable of modulating coherent light, e.g. produced by a laser. These requirements are extremely demanding and expensive to achieve in practice.

One approach is presented in GB2330471A and is illustrated schematically in FIG. 1. This document describes a holographic display technique, which is referred to as Active Tiling™, and involves the use of a relatively small EASLM 1 in combination with a relatively large Optically Addressable Spatial Light Modulator (OASLM) 2. This part of the system comprises the so-called "replicating" optics. The holographic matrix is subdivided into a set of sub-holograms, with the data for each sub-hologram being passed in turn to the EASLM 1. The EASLM 1 is illuminated from one side with incoherent light 3. The OASLM 2 comprises a sheet of bistable liquid crystal (in one example the liquid crystal is a ferroelectric liquid crystal) which is switched from a first to a second state by incident light. Replicating optics 4, disposed between the EASLM 1 and the OASLM 2, cause the output of the EASLM 1 (i.e. light transmitted through the EASLM 1) to be stepped across the rear surface of the OASLM 2. The bistable nature of the OASLM liquid crystal means that the portion or "tile" of the OASLM 2 onto which a sub-holographic image is projected, remembers that image until such time as the OASLM is reset by the application of an electrical voltage. It will be appreciated that, providing a reset voltage is applied only at the end of a complete scan, immediately prior to reset the OASLM 2 will have "stored" in it a replica of the complete holographic matrix. An alternative arrangement which avoids the need for an OASLM by making use of the "memory" of a human eye is described in PCT/GB00/01903.

Considering the arrangement of FIG. 1, the CGH displayed on the OASLM 2 is "read" using an arrangement such as that illustrated in FIG. 2. This arrangement is referred to as the "replay" optics. The OASLM 2 is typically illuminated with a plane wave originating from a point source 15 and the reflected light is focused down by replay optics 7,8 to form a 3D image. Normal incidence illumination is achieved with the use of a beam splitter 5, although a slight off axis angle of illumination may alternatively be used. In either case, large collimating optics 6 are required to provide a large illumination wavefront. The need for a beam splitter 5 and collimating optics 6 adds to the cost of the system as high quality, large aperture (large FOV) optics are expensive. To reduce costs, lower quality optics may be used. However this will result in poorer performance.

SUMMARY OF THE INVENTION

According to a first aspect of the present invention there is provided a holographic display comprising:

a spatial light modulator, SLM, arranged to display a set of tiled holographic images;

illuminating means for illuminating a surface of the SLM; and replay means for focusing light reflected from the SLM surface to present a three dimensional image, characterised in that the illuminating means comprises a light source appearing at a DC spot position of the replay means.

It is a feature of the replay optics that specularly reflected light from the SLM is focused down to what is known as a "DC spot". The present invention takes advantage of the fact that light originating or appearing to originate from that same DC spot will pass through the replay optics (in the reverse direction) and impinge on the SLM as an approximately plane wave. The need for large collimating optics and a beam splitter is avoided. It is possible to introduce the illuminating light from a location near the DC spot position without causing undue obscuration of the 3D image.

Preferably the SLM is an optically addressable spatial light modulator, OASLM, and is located in front of replicating optics arranged to illuminate a rear surface of the OASLM with light corresponding to said holographic images. More preferably, an electrically addressable spatial light modulator, EASLM, is located behind the replicating optics and is arranged to display each of said holographic images in sequence. Alternatively, the SLM may be an EASLM which, being electrically addressed, does not require the use of replicating optics.

Preferably, said light source comprises a mirror, and the illuminating means further comprises a laser or other light generating means arranged to direct light onto the mirror. Alternatively, the light source may comprise a laser or other light generating means. However, the use of a mirror enables a more compact system to be produced, enhancing the viewer's ability to access the 3D image.

Preferably, said illuminating means is arranged to provide at the DC spot an aberrated point source. The aberration may be such that it negates aberrations in the replay optics so as to produce substantially plane wave illumination of the SLM. To achieve this, the illuminating means preferably comprises aberrating optics in front of the light generating means. Using this mechanism, it is possible to use lower quality replay optics and/or improve perceived image quality.

Preferably, the illuminating means comprises one or more optical elements for introducing aberrations into the light emanating at the point source.

According to a second aspect of the present invention there is provided a holographic display comprising:

a spatial light modulator, SLM, arranged to display one or more holographic images;

replay means for focusing light reflected from the SLM surface to present a three dimensional image;

a light source for illuminating a surface of the SLM and arranged to provide an aberrated point source appearing substantially at a DC spot position of the replay means so as to compensate for aberrations in the replay optics.

The light source may comprise light generating means such as a laser. The light generating means may be located at the DC spot, or the light source may additionally comprise a mirror located near the DC spot, with light from the light generating means being directed at the mirror which reflects the light into the replay optics.

According to a third aspect of the present invention there is provided a method of illuminating a surface of a spatial light modulator (SLM) forming part of a holographic display, the method comprising:

directing light from a point source located or appearing to be located at a DC spot position of replay optics, into the replay optics, and aberrating the light to compensate for aberrations in the replay optics.

The aberrations may be introduced into the light so that the light which is incident on said surface of the SLM to illuminate the SLM is substantially in the form of a plane wave.

BRIEF DESCRIPTION OF THE DRAWINGS

For a better understanding of the present invention and in order to show how the same may be carried into effect reference will now be made, by way of example, the accompanying drawings, in which.

DETAILED DISCUSSION OF EMBODIMENTS

Conventional replication optics of a holographic display system have been described with reference to FIG. 1. There will now be described replay optics for use with the holographic display of FIG. 1 (and other holographic displays) and which replaces the conventional replay optics system shown in FIG. 2.

Figure 1:
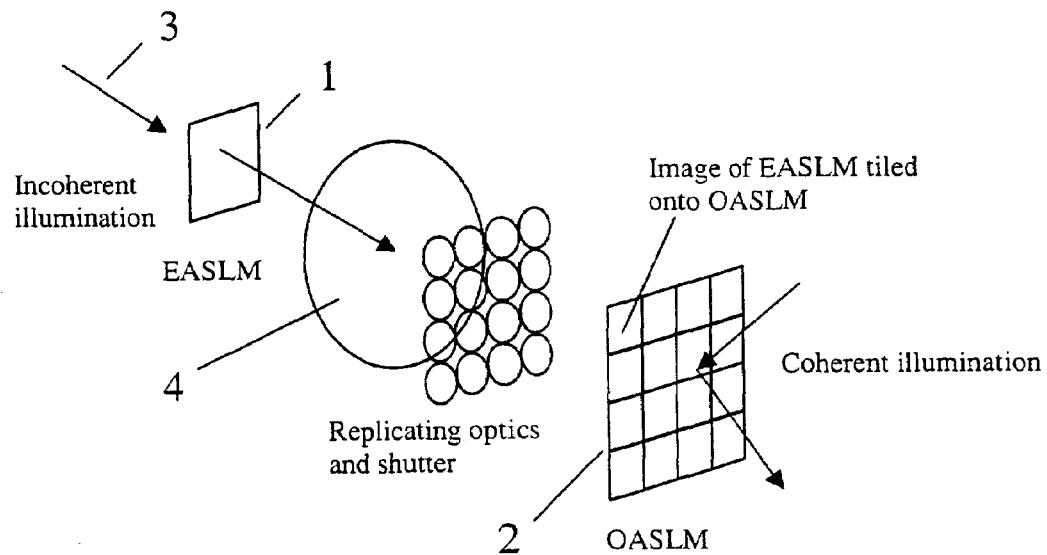
FIG. 1 illustrates replication optics of an Active Tiling™ holographic display system.
Figure 2:
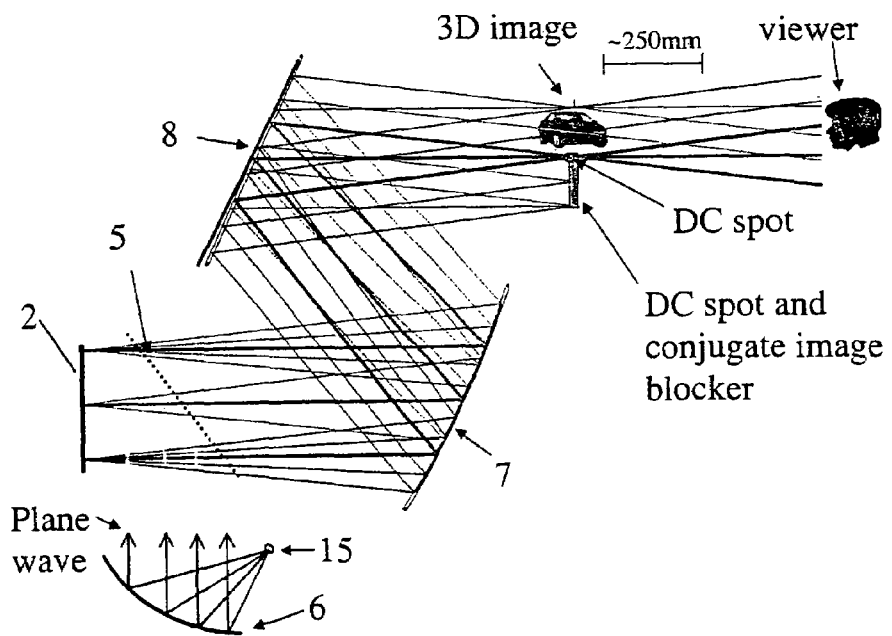
FIG. 2 illustrates replay optics of an Active Tiling™ holographic display system.
Figure 3:
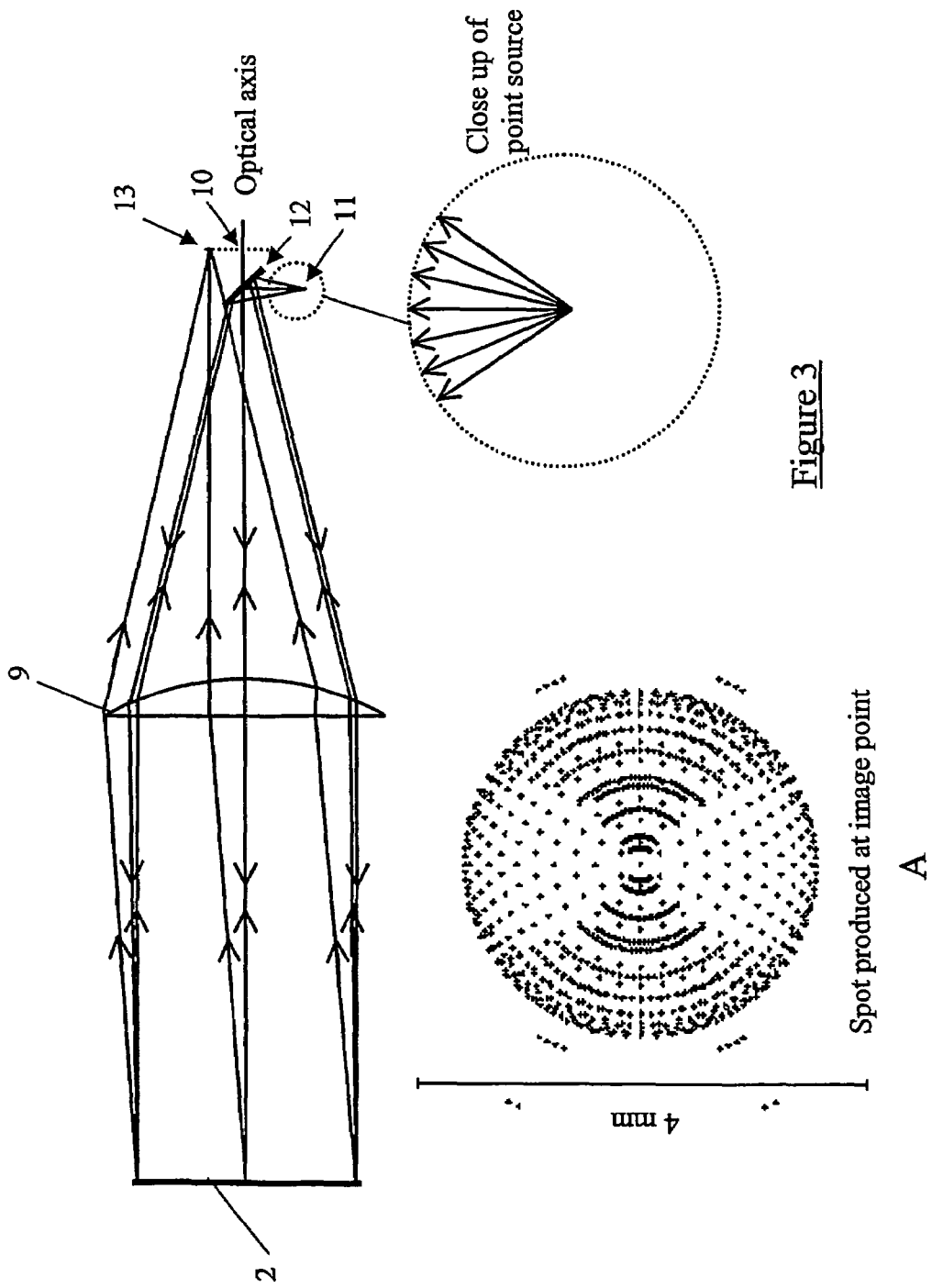
FIG. 3 illustrates replay optics of a holographic display system with a point source appearing to be located at the DC spot.

FIG. 3 illustrates a simplified replay system comprising a single lens 9 arranged to direct light to and from the surface of an optically addressable spatial light modulator (OASLM) 2 which forms part of the holographic display of FIG. 1 (it will be appreciated that in practice the replay optics may comprise further lenses and optical components). FIG. 3 illustrates the DC spot position 10 of the replay optics, this being the point at which specularly reflected light from the OASLM 2 (illuminated with a plane wave) comes to a focus. A point source of light 11 which may comprise a laser is located off axis, with light from the point source being directed onto the reflecting surface of a mirror 12. The mirror 12 is oriented at an angle of 45 degrees to the optical axis of the replay optics. The point source 11 and the mirror 12 are arranged with respect to one another such that the light reflected by the mirror 12 appears to originate from the DC spot position 10.

FIG. 3 traces the light rays through the replay optics. The light originating from the point source 11 tends to be incident on the surface of the OASLM 2 as a plane wave. The CGH image displayed on the OASLM 2 appears as a three dimensional image at an image point 13. The conjugate image (appearing beneath the optical axis as viewed in FIG. 3) and DC spot may be blocked by the mirror 12 and the point source 11 (and possibly an additional block not illustrated in FIG. 3).

The system of FIG. 3 was modelled using ZEMAX™ using the following criteria:

The illumination wavelength is 514.5 nm (corresponding to an Argon ion laser).

The large lens 9 is spherical plano-convex, 30 mm thick with a radius of curvature of 1100 mm, made from BK7 glass.

The lens 9 has a focal length (f) of 2.11 m at a wavelength of 514.5 nm

The hologram is 280×160 mm with 7×7 um pixels.

The replay is based on an f-f system where the lens 9 is a distance f from hologram.

Holograms are complicated diffraction gratings. The replay of a single image point by a hologram can readily be simulated by considering the propagation of a wavefront through (or reflected from) a grating. This process was used in the simulation of the replay from a hologram using ZEMAX™. The minimum spatial light modulation period (or grating period) in the hologram is 14 um which yields a diffraction angle of 2.1°. Rays diffracted at this angle were considered to form the image point.

A point light source is positioned such that its reflection in a small mirror coincides with the DC spot position. The production of such a point source would be simple for one skilled in the art, e.g. illuminating a microscope objective with a laser beam. This is equivalent to introducing a spherical wavefront into the system. This wave front is propagated by ray tracing through the lens to the hologram. At the hologram, both the specularly reflected rays (which produce the DC spot) and the diffracted rays (that produce the image point) are calculated. These are propagated back through the lens 9 to the image region. The intersects of these rays on a plane at the desired image point are determined. This yields a spot diagram that indicates how small an image point is produced (generally, a smaller spot is more desirable).

The insert A shown in FIG. 3 illustrates the spot produced at the image point with a point light source located at the DC spot, as simulated by the ZEMAX™ system. The relatively large size of this spot is a result of imperfections, i.e.

aberrations, in the replay optics. It is possible to compensate for the effects of the aberrations by introducing aberrations into the light emanating from the point source.

Figure 4:
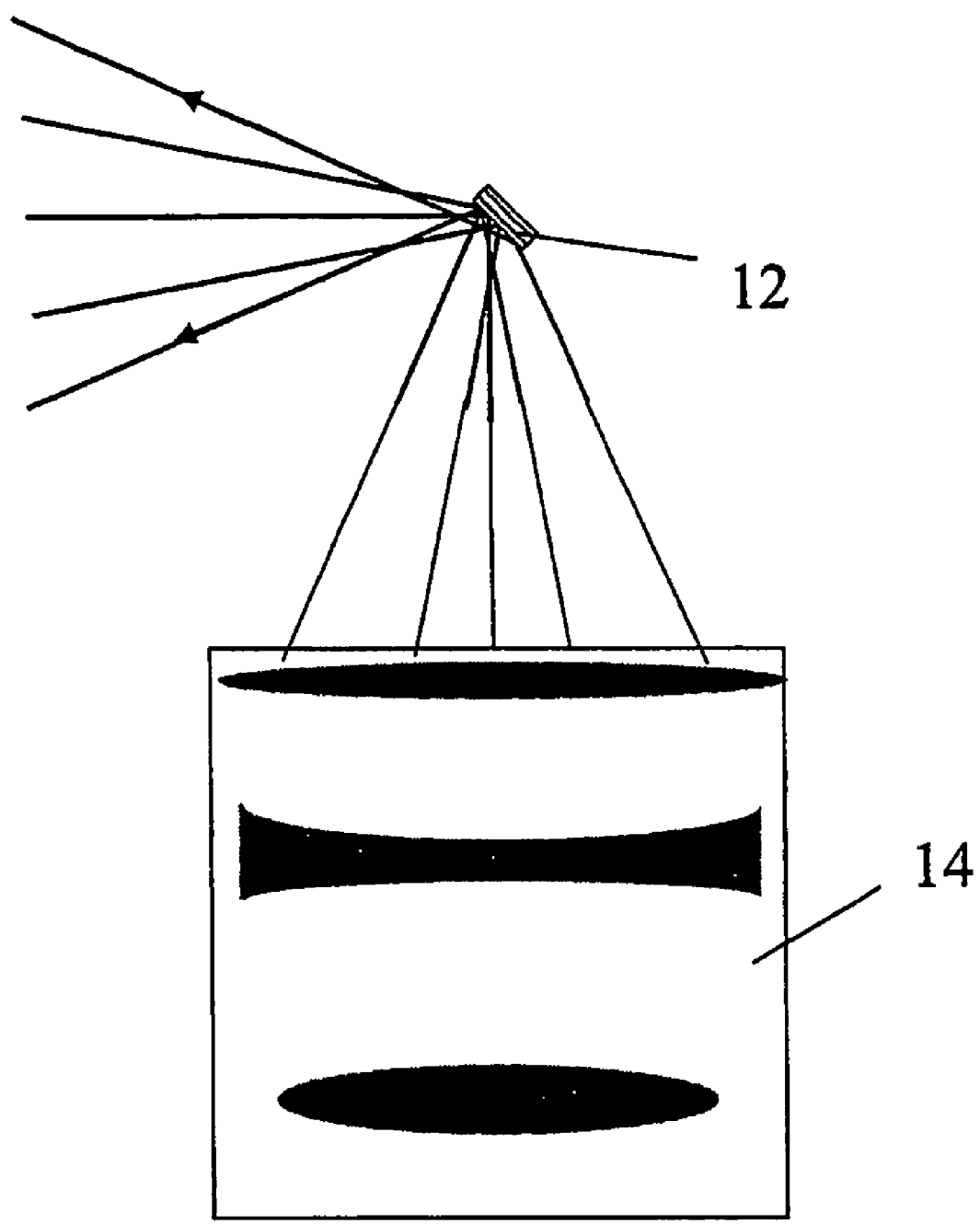
FIG. 4 illustrates in detail a modified light source for use in replay optics of a holographic display system.

FIG. 4 illustrates one possible sequence of optical components 14 for introducing aberrations into the point source light, and which would be located between the point source 11 and the mirror 12. The exact nature of the optical components may be determined by for example analysing the spot pattern A produced by the replay optics in the absence of the compensating optics 14. It is noted that at least a part of the compensation may be designed into the mirror 12.

Figure 5:
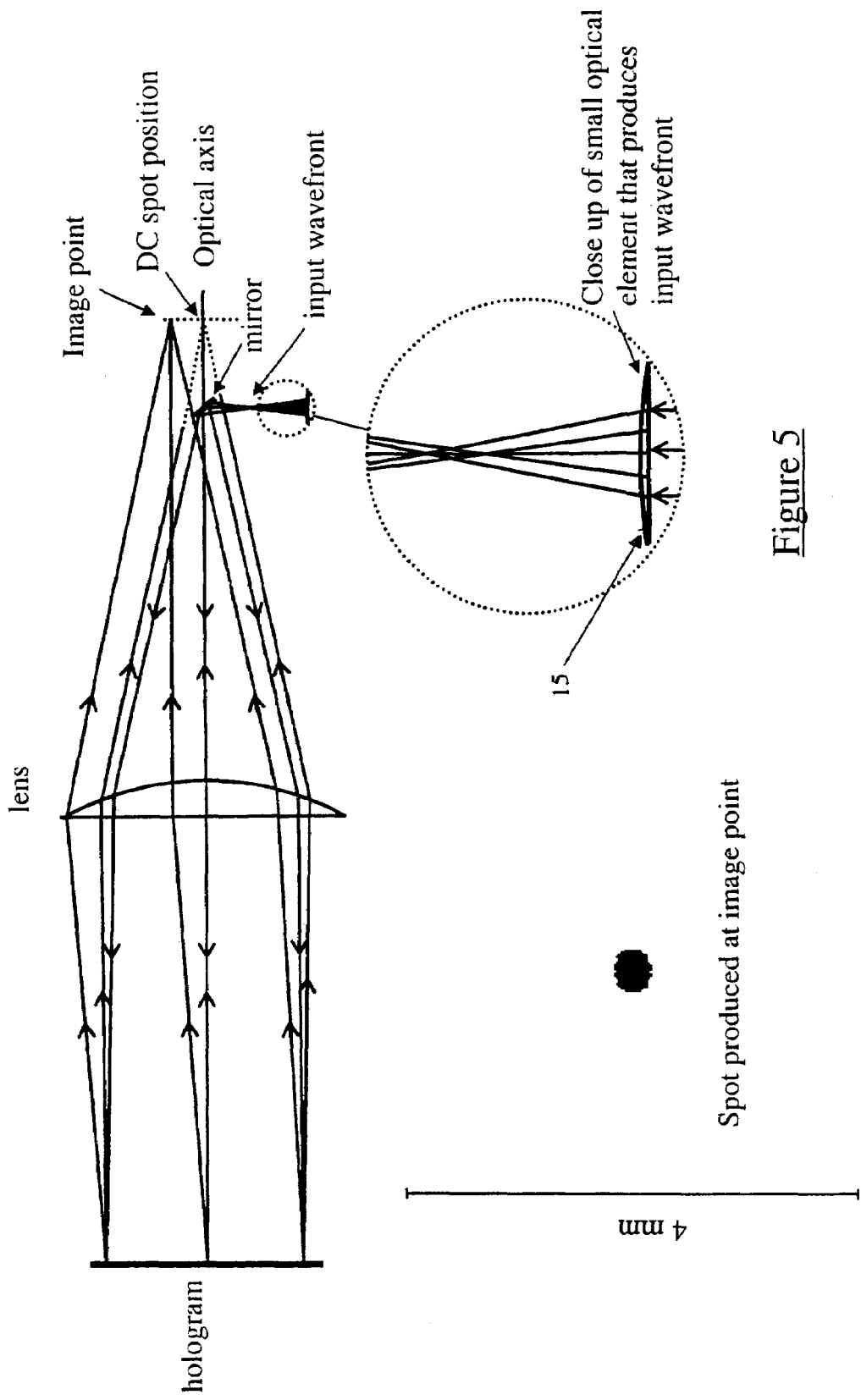
FIG. 5 illustrates modified replay optics for use in a holographic display system and comprising the modified light source of FIG. 4.

FIG. 5 illustrates replay optics incorporating compensating optics 15 which introduces an optimised wavefront into the system. In this case a single plano-convex aspheric lens, illuminated with a plane wave, is used to produce the wavefront. The lens is 17.9 mm thick, made from BK7 glass, and has a base radius of curvature of 48.3 mm. As described above, in order to simulate the results, rays are traced through the system to determine the spot size in the image. ZEMAX™ was programmed to optimise the profile of the aspheric lens to minimise the image spot size. A reduced spot size is clearly demonstrated in the insert B. This is only illustrative of the method for achieving an improved image replay by optimization of the input wavefront One skilled in the use of ZEMAX™ or alternative optical design packages will be able to design a multiple element system for producing the input wavefront, optimised against any desired criteria (e.g. improved replay quality across the whole image rather than at a single point, minimized system cost, etc).

It will be appreciated by the person of skill in the art that various modifications may be made to the above described embodiments without departing from the scope of the present invention.

The invention claimed is:

1. A holographic display comprising:
    a spatial light modulator, SLM, arranged to display a set of tiled holographic images;
    illuminating means arranged to illuminate a surface of the SLM; and
    replay means arranged to focus light reflected from the SLM surface to present a three dimensional image, wherein the illuminating means comprises a light source appearing substantially at a zeroth order point (dc & spot position) of the replay means, such that light from the light source is arranged to pass through said replay optics before illuminating the surface of the SLM.

2. The display according to claim 1, wherein the SLM is an optically addressed spatial light modulator, OASLM, and is located in front of optical components arranged to illuminate a rear surface of the OASLM with light corresponding to said holographic images.

3. The display according to claim 2, wherein said optical components comprise an electrically addressed spatial light modulator, EASLM, which is arranged to display each of said holographic images in sequence and replicating optics for directing light from the EASLM to the OASLM.

4. The display according to claim 1, wherein the SLM is an EASLM.

5. The display according to claim 1, wherein said light source comprises a mirror, and the illuminating means further comprises a laser or other light generating means arranged to direct light onto the mirror.

6. The display according to claim 1, wherein said illuminating means is arranged to cause an aberrated point source to appear at the dc spot, the aberration being such that it negates aberrations in the replay optics.

7. The display according to claim 6, wherein the illuminating means comprises aberrating optics in front of the light source.

8. A holographic display comprising:
    a spatial light modulator, SLM, arranged to display one or more holographic images;
    replay means arranged to focus light reflected from the SLM surface to present a three dimensional image; and
    a light source arranged to illuminate a surface of the SLM and arranged to cause an aberrated point source to appear substantially at a zeroth order point (dc spot position) of the replay means so as to compensate for aberrations in the replay means, wherein light from said light source passes through said replay means before illuminating the SLM.

9. The display according to claim 8, wherein the SLM is an optically addressed spatial light modulator, OASLM, and is located in front of optical components arranged to illuminate a rear surface of the OASLM with light corresponding to said holographic images.

10. The display according to claim 9, wherein said optical components comprise an electrically addressed spatial light modulator, EASLM, which is arranged to display each of said holographic images in sequence and replicating optics for directing light from the EASLM to the OASLM.

11. The display according to claim 8, wherein said light source comprises a mirror and a laser arranged to direct light onto the mirror.

12. The display according to claim 8, wherein said light source is arranged to cause an aberrated point source to appear at the dc spot, the aberration being such that it negates aberrations in the replay optics.

13. The display according to claim 8 further comprising aberrating optics located in front of the light source.

14. A method of illuminating a surface of a spatial light modulator (SLM) forming part of a holographic display, the method comprising:
    directing light from a point source appearing to be located at a zeroth order point (dc spot position) of a system of replay optics, into the replay optics; and
    aberrating the light to compensate for aberrations in the replay optics before illuminating the surface of the SLM.

15. The method according to claim 14 further comprising illuminating a rear surface of an optically addressed spatial light modulator, OASLM, with light corresponding to said holographic display, wherein the OASLM is located in front of optical components.

16. The method according to claim 15, wherein said optical components comprise an electrically addressed spatial light modulator, EASLM, the method further comprising:
    arranging the EASLM to display holographic images in sequence; and
    directing light from the EASLM to the OASLM.

17. The display according to claim 14, wherein the SLM is an EASLM.

18. The method according to claim 14 further comprising directing light onto a mirror.

19. The method according to claim 14 further comprising arranging said point source to cause an aberrated point source to appear at the dc spot, the aberration being such that it negates aberrations in the replay optics.

20. The method according to claim 14 further comprising locating aberrating optics in front of the point source.

* * * * *

UNITED STATES PATENT AND TRADEMARK OFFICE
CERTIFICATE OF CORRECTION

PATENT NO. : 7,317,564 B2 Page 1 of 1
APPLICATION NO. : 11/494766
DATED : January 8, 2008
INVENTOR(S) : Douglas Payne It is certified that error appears in the above-identified patent and that said Letters Patent is hereby corrected as shown below:

In claim 1, please replace "dc & spot position" with --dc spot position--.

Signed and Sealed this

Twenty-first Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 7,317,564 B2 Page 1 of 1
APPLICATION NO. : 11/494766
DATED : January 8, 2008
INVENTOR(S) : Douglas Payne It is certified that error appears in the above-identified patent and that said Letters Patent is hereby corrected as shown below:

In claim 1, Column 5, line 44, please replace "dc & spot position" with --dc spot position--.

This certificate supersedes the Certificate of Correction issued October 21, 2008.

Signed and Sealed this

Eleventh Day of November, 2008

JON W. DUDAS
*Director of the United States Patent and Trademark Office*